Dec. 8, 1931.　　　　　K. I. MARSHALL　　　　　1,835,169
APPARATUS FOR CONDENSING AND COLLECTING MERCURY FROM GASES
CONTAINING THE SAME TOGETHER WITH CORROSIVE SUBSTANCES
Filed July 8, 1929

INVENTOR.
Kenneth I. Marshall,
BY Arthur P. Knight Alfred W. Knight

ATTORNEYS.

Patented Dec. 8, 1931

1,835,169

UNITED STATES PATENT OFFICE

KENNETH I. MARSHALL, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR CONDENSING AND COLLECTING MERCURY FROM GASES CONTAINING THE SAME TOGETHER WITH CORROSIVE SUBSTANCES

Application filed July 8, 1929. Serial No. 376,611.

This invention relates to apparatus for treatment of gases coming from retorts or furnaces for recovery of mercury from ores thereof, such apparatus being for the purpose of condensing and collecting mercury from such gases.

The main object of the invention is to provide an apparatus for this purpose which will be resistant to the corrosive action of the gases or of the fumes carried thereby. In the distillation and recovery of mercury from cinnabar and similar ores by the process now in use, the ore is subjected to heat treatment in furnaces in such manner that mercury or compounds thereof pass off from the furnace, together with gases containing a considerable amount of corrosive agents including sulphurous and/or sulphuric acid or anhydride.

To recover the mercury from such gases it is necessary to subject the same to a cooling and condensing operation to condense and collect the mercury. For this purpose it has been customary to use condensing and collecting means formed of terra cotta or similar corrosion-resistant material. In order to increase the efficiency of cooling, it is desirable to provide cooling means of metal so as to take advantage of the high heat conductivity of metals as compared with terra cotta or similar materials, but the corrosive action of the mercury carrying gases has heretofore prevented the successful use of metallic condensers and/or collectors for this purpose. This corrosive action is particularly serious during the stage of cooling and condensing when the temperature has fallen below the condensation temperature or dew point of the water vapor present, as the condensed water vapor is a material factor in the corrosion. I have found that by making the condenser and/or collector of amalgamable metal, such as copper, or by providing an iron or steel condenser with a coating of such amalgamable metal, the mercury vapor condenses on the surface, forming an amalgam which protects the metal beneath the amalgam surface from attack by the corrosive agents present in the gas. The corrosive action is therefore practically eliminated by the formation of the amalgam coating which automatically forms on such surfaces exposed to mercury vapor.

The accompanying drawings illustrate embodiments of my invention and referring thereto:

Figure 1:
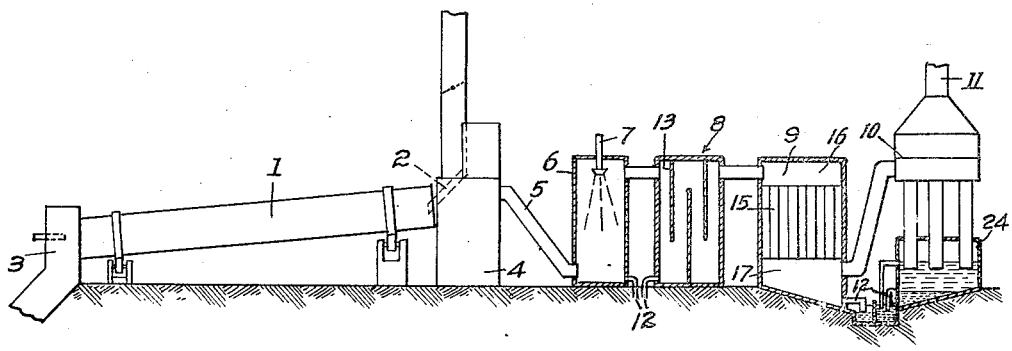
Fig. 1 is a side elevation of a mercury recovery apparatus with the condensing and/or collecting means partly in section.

In Fig. 1 of the drawings, a mercury retort is indicated at 1, said retort being for example of the rotary kiln type as shown or being for example of the shaft type or any other suitable type. Suitable means indicated at 2 for feeding mercury bearing ore to the retort and suitable means indicated at 3 being provided for heating the retort to the desired temperature, the gases passing from the retort and carry mercury vapor, together with products of combustion and sulphur bearing gases, passed to a stack chamber 4 and thence through a pipe 5 to a spray chamber 6 provided with means 7 for spraying water into the gases and from said spray chamber the gases pass through the condensing and/or collecting means which may be of any suitable type, but are in any case constructed more or less completely of metal. For example, said condensing and/or collecting means may comprise a baffle chamber 8, a condenser of the multi-tube type indicated at 9 and a condenser and/or collector 10, which is adapted to operate effectively in separating the condensed mercury by centrifugal action. From the last metallic condenser and/or collector the waste gases may pass directly to an outlet flue or stack 11, or if desired the outlet flue 11 may lead to a discharge into the ordinary terra cotta pipe line heretofore used. The spray chamber 6 may be of brick work or masonry so as not to be affected by the corrosive gases or if the precaution is taken to maintain the temperature in the spray chamber above the dew point of water, the said spray chamber may be made of iron or steel. In case the operation is so carried out as to cool the gases in the spray chamber below the dew point of water at the prevailing pressure, the parts of the spray chamber exposed to such gases should be of amalgamable metal, such as copper or be coated with such metal. In case the baffle member 8 is maintained below the dew point of water the baffles indicated at 13 and the walls of the chamber may consist of copper or other amalgamable metal which is amalgamated either before or after the apparatus is put into operation, or the said parts may be of iron or steel which is copper coated and amalgamated as stated.

Figure 2:
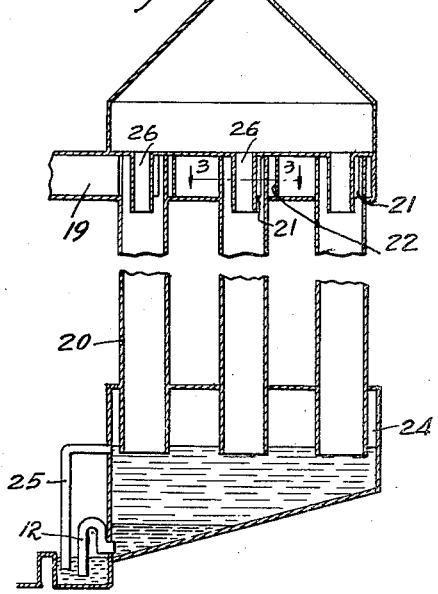
Fig. 2 is an enlarged sectional view of one form of condensing and/or collecting means.
Figure 3:
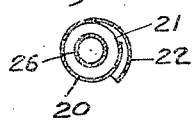
Fig. 3 is a section on line 3—3 in Fig. 2.

The condensing means 9 is shown as consisting of a plurality of tubes 15 connecting upper header 16 and lower header 17 and exposed to cooling action by contact with atmospheric air or by cooling fluid circulated in contact with said pipes 15 in the usual manner of multi-tubular condensers and all parts of this condensing means are constructed or coated with amalgamable metal, such as copper, in case the temperature in such apparatus is maintained below the dew point of water vapor. It will be understood that the several apparatuses 6, 8 and 9 serve as cooling or condensing and also as collecting means for any mercury which may be condensed, the collected material being carried off through conduits 12. I prefer, however, to provide for more effective cooling, condensing and/or collection by means of a centrifugal cooler and/or separator, such for example as shown at 10 in Fig. 1 and in Figs. 2 and 3.

Said condensing and/or collecting apparatus comprises an inlet header 19, a plurality of cooler and separator tubes 20 communicating at their upper ends with the inlet header 19 through passage means 21 provided with deflectors 22 or otherwise formed to introduce the gases into the tubes 20 with a tangential or vortical movement. The tubes 20 open at their lower ends into a receiving chamber 24 which may be provided with an overflow pipe 25 so located that a body of condensed liquid is maintained within the receptacle 24, forming a seal for the lower ends of the separator tubes. Outlet passages 26 are provided at the upper ends of the separator tubes and located axially therein so that the effluent gases from which the mercury has been separated, by the centrifugal action in the separator tubes can pass out through these passages 26 to the outlet flue 11. It will be understood that instead of this specific form of condensing and/or collecting means, any other suitable condensing and/or collecting means may be used in which the gases or vapors are subjected to centrifugal action in contact with the walls of the separator tubes so as to increase the efficiency of cooling and/or collection; and that any one or more of the types of cooling and/or condensing means may be used, without the others. In any case, however, all the metallic parts of such cooling and/or collecting means, as well as all metallic flues connecting same will be made of or coated with copper or other amalgamable metal.

Figure 4:
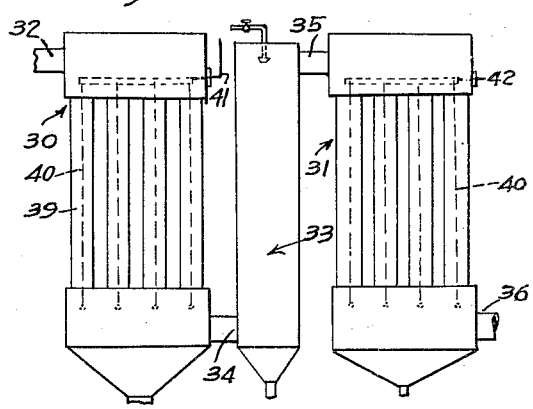
Fig. 4 is an elevation of another embodiment of the invention.

If desired, an electrical precipitator can be used in place of or in addition to any of the cooling and separating means above described, for example, as shown in Fig. 4, I may provide two electrical precipitators 30 and 31 connected in series, the precipitator 30 being provided with an inlet flue 32 for conducting thereto the gases passing from the mercury producing retort or furnace and with an outlet flue 33 for conducting the gases from the precipitator 30 to suitable cooling means indicated at 34 which may, for example, be a spray chamber. From said cooling means said gases are conducted by a flue 35 to the inlet of the electrical precipitator 31, the outlet 36 of said precipitator leading to a stack or other means for disposition of the waste gases. The precipitators 30 and 31 may be of any usual or suitable construction being herewith shown as of the multiple pipe type each comprising a plurality of pipes 39 serving as collecting electrodes and with discharge electrodes 40 formed as wires or rods extending axially in the respective pipes and mounted on suitable insulating means, said discharge electrode being connected by wires 41 and 42 to the usual means for supplying rectifier current thereto at sufficiently high potential difference to maintain silent discharge between the wires 4 or within the tubes 39 and thereby cause precipitation of suspended material on the walls of said tubes. The precipitator 30 may be maintained at a temperature above the dew point of water and in that case it may be constructed of iron or steel in the usual manner, and the precipitator 31 may be maintained below the dew point of water and may be constructed of copper or other amalgable metal or lined with such metal in the manner above described, both the discharge and collecting electrodes being preferably composed of or coated with such metal. The particular application of my invention in connection with an electrical precipitator is not specifically claimed herein as it forms the subject matter of my application Ser. No. 346,808, filed March 13, 1929.

If desired, the surface of copper or similar metal may be amalgamated before assembling into any of the forms of apparatus above described or before the apparatus is put into operation, but in general this is not necessary as I have found that the amalgamation of the copper surface exposed to the gases containing mercury vapor takes place automatically in the operation of the apparatus as a condenser and/or collector. In such operation the hot gases passing from the mercury furnaces, (for example, a furnace of the rotary kiln type in which the mercury ore is subjected to heat treatment by the action of combustion gases produced by combustion of a suitable fuel with air) contains in addition to the residual air and products of combustion, oxidization products of sulphur, and mercury vapor and/or mercury compounds. Such gases coming into contact with the copper or amalgamable metal surfaces of the condenser rapidly deposit a coating of mercury thereon, forming a surface which is resistant to the action of the corrosive elements of the gases and in the same manner the action of the gases maintains such surfaces in an amalgamated state and thereby resistant to the corrosive elements present during the operation of the apparatus.

I claim:

1. An apparatus for condensing and collecting mercury from gases containing the same together with corrosive materials, comprising passage means having the walls thereof provided with surfaces of amalgamated copper.

2. An apparatus for condensing and collecting mercury from gases containing the same together with corrosive materials, comprising passage means having the walls thereof formed of iron provided with an internal coating of copper.

3. An apparatus for condensing and collecting mercury from gases containing the same together with corrosive materials, comprising passage means having the portions thereof which are exposed to said gases, formed of iron provided with an amalgamated coating of copper.

In testimony whereof I have hereunto subscribed my name this 29th day of June, 1929.

KENNETH I. MARSHALL.